United States Patent [19]

Noda

[11] Patent Number: 5,274,208

[45] Date of Patent: Dec. 28, 1993

[54] HIGH FREQUENCY HEATING APPARATUS

[75] Inventor: Tomimitsu Noda, Gifu, Japan

[73] Assignee: Kabushiki Kaisha Toshiba, Kawasaki, Japan

[21] Appl. No.: 675,489

[22] Filed: Mar. 25, 1991

[30] Foreign Application Priority Data

| Mar. 28, 1990 | [JP] | Japan | 2-79186 |
| May 25, 1990 | [JP] | Japan | 2-136396 |
| May 25, 1990 | [JP] | Japan | 2-136397 |
| May 25, 1990 | [JP] | Japan | 2-136398 |
| May 25, 1990 | [JP] | Japan | 2-136399 |

[51] Int. Cl.$^5$ .............................................. H05B 6/68
[52] U.S. Cl. ..................... 219/10.55 B; 219/10.55 R; 219/10.55 F; 219/10.55 M; 363/20; 363/131
[58] Field of Search ................ 219/10.55 B, 10.55 R, 219/10.55 F, 10.55 M; 363/131, 20, 21

[56] References Cited

U.S. PATENT DOCUMENTS

| 4,285,143 | 1/1981 | Miura et al. | 219/10.55 B |
| 4,713,528 | 12/1987 | Hirata | 219/10.55 B |
| 4,777,575 | 10/1988 | Yamato et al. | 219/10.55 B |
| 4,886,951 | 12/1989 | Matsumoto et al. | 219/10.55 B |
| 4,888,461 | 12/1989 | Takano et al. | 219/10.55 B |
| 4,933,830 | 6/1990 | Sato et al. | 219/10.55 B |
| 4,962,292 | 10/1990 | Aoki | 219/10.55 B |
| 5,021,620 | 6/1991 | Inumada | 219/10.55 B |

Primary Examiner—Bruce A. Reynolds
Assistant Examiner—Tu Hoang
Attorney, Agent, or Firm—Limbach & Limbach

[57] ABSTRACT

A high frequency heating apparatus includes a frequency conversion section including a switching element and converting a commercial power supply frequency to high frequency waves by an on-off control of the switching element, a step-up transformer stepping up an alternating output from the frequency conversion section, a rectification circuit connected at a secondary side of the step-up transformer, a magnetron driven by a direct current power from the rectification circuit, an anode current detection circuit detecting an anode current of the magnetron, and a control circuit for controlling an "on" period of the switching element in response to a detection signal from the anode current detection circuit so that the anode current is maintained at a predetermined value, thereby stabilizing a high frequency power produced by the magnetron against different commercial power supplies.

16 Claims, 14 Drawing Sheets

HIGH FREQUENCY HEATING APPARATUS

BACKGROUND OF THE INVENTION

This invention relates to a high frequency heating apparatus such as a microwave oven wherein a commercial power is converted by a frequency conversion section to a high frequency power, which power is supplied to a magnetron through a step-up transformer to drive the same, and more particularly to such a high frequency heating apparatus wherein the magnetron can be normally driven in spite of different commercial power supplies.

Generally, a microwave oven is known as a high frequency heating apparatus wherein a commercial high frequency power is converted by a frequency conversion section to a high frequency power, which power is supplied to a magnetron through a step-up transformer to drive the same, thereby high frequency heating a food to cook the same. In the conventional microwave oven, the magnitude of a high frequency power depends upon the magnitude of an anode current of the magnetron and the magnetron anode current depends upon an "on" period of a frequency converting switching element of the frequency conversion section. In most microwave ovens, therefore, the "on" period of the switching element is determined in accordance with the voltage of a single commercial power supply so that the magnetron anode current is maintained at a preselected value. For the purpose of switching heating modes, the magnetron is driven continuously or intermittently without controlling the magnitude of the magnetron anode current.

When the conventional microwave oven as described above is used in a region where the commercial power supply voltage is different from that determined for the microwave oven, the magnetron cannot be normally operated when an input voltage is too low or an extremely large current flows into the magnetron when the input voltage is too high. Consequently, the consumers of the microwave ovens need to have the microwave ovens repaired or to buy new ones when they move from a region to another. Furthermore, when a house is furnished with both 100 V and 200 V power supplies, an error in connection causes the microwave ovens to burn out.

SUMMARY OF THE INVENTION

Therefore, an object of the present invention is to provide a high frequency heating apparatus wherein the magnetron can be driven normally in its operation range even when the different commercial power supply voltages are supplied to the frequency conversion section such that the users can be prevented from being forced to have the apparatus repaired or to replace the old apparatus with a new one and such that the high frequency heating apparatus can be prevented from being burnt out because of the error in connection.

To achieve the above-described object, the present invention provides a high frequency heating apparatus comprising a frequency conversion section including a switching element and converting a commercial power supply frequency to high frequency waves by an on-off control of the switching element, a step-up transformer stepping up an alternating output from the frequency conversion section, a rectification circuit connected at a secondary side of the step-up transformer,, a magnetron driven by a direct current power from the rectification circuit, an anode current detection circuit detecting an anode current of the magnetron, control means for controlling an "on" period of the switching element in response to a detection signal from the anode current detection circuit so that the anode current is maintained at a predetermined value, thereby stabilizing a high frequency power produced by the magnetron against different commercial power supplies, a magnetron temperature sensing section sensing a temperature of the magnetron, means for compensating the "on" period of the switching element in accordance with the temperature of the magnetron sensed by the magnetron temperature sensing section so that an input power to the frequency conversion section is maintained at a predetermined value.

In accordance with the above-described arrangement, when supplied with the detection signal from the anode current detection circuit, the control means controls the "on" period of the switching element so that the magnetron anode current is maintained at the predetermined value. Consequently, even when the commercial power supply voltage is changed between 100 V and 200 V, variations in the magnetron anode current can be restricted to a relatively small range.

Furthermore, the magnetron temperature sensing section is provided for sensing the temperature of the magnetron and means is provided for compensating the "on" period of the switching element in accordance with the temperature of the magnetron sensed by the magnetron temperature sensing section so that the input power to the frequency conversion section is maintained at the predetermined value. Consequently, the high frequency power can be maintained at the predetermined value in spite of variations in the magnetron temperature and variations in the magnetron anode current, with a lapse of the magnetron operation period.

The high frequency heating apparatus may further comprise a voltage detection section detecting a commercial power supply voltage supplied to the frequency conversion section and means for interrupting the operation of the switching element when the determined magnitude of the commercial power supply voltage detected by the voltage detection section is out of a predetermined range. This arrangement protects circuit elements against an extremely large or small power supply voltage.

The high frequency heating apparatus may further comprise another voltage detection section detecting a voltage applied to the switching element and means for interrupting the operation of the magnetron when the voltage detected by the voltage detection section exceeds a predetermined allowable value. This arrangement protects the magnetron switching element against an abnormal voltage and restricts the unstable state of the magnetron to the minimum, thereby protecting the magnetron and the circuit elements. In this arrangement, when the magnetron is designed to be re-driven a predetermined period after the interruption of the operation thereof. If the voltage detection section should mistakenly detect an abnormal voltage under the influence of an electrical noise or the like or if the magnetron operation should become unstable temporally, the magnetron may automatically be re-driven subsequently and its operation can be continued when the magnetron returns to the normal state. Thus, influences of the error detection and temporary unstable operation can be eliminated.

Furthermore, when the number of interruptions of the magnetron operation reaches a preselected value, the magnetron can be prevented from being re-driven subsequently.

Furthermore, the high frequency heating apparatus may be further provided with means for interrupting the operation of the magnetron or reducing the high frequency power when the temperature of the magnetron sensed by the magnetron temperature sensor exceeds a predetermined upper limit value. In this arrangement, the overheated condition of the magnetron can be prevented.

As shown in FIG. 5, since the changes in the magnetron anode temperature and those in the switching element temperature have an interrelation with each other, a switching element temperature sensing section may be provided for sensing the temperature of the switching element. When the "on" period of the switching element is compensated in accordance with the sensed switching element temperature, the high frequency power can be maintained at the predetermined value. In this arrangement, too, when the high frequency heating apparatus may be further provided with means for interrupting the operation of the magnetron or reducing the high frequency power when the temperature of the magnetron sensed by the magnetron temperature sensor exceeds a predetermined upper limit value. Consequently, an extremely large thermal stress can be prevented from being applied to the switching element or other circuit elements.

The high frequency heating apparatus of the present invention may further comprise timing means for measuring an elapsed time from the completion of a previous cooking operation to the start of a present cooking operation and means for compensating the "on" period of the switching element in accordance with the elapsed time measured by the timing means so that an input power to the frequency conversion section is maintained at a predetermined value. Even when the initial magnetron temperature at the start of the cooking differs in accordance with the elapsed time from the completion of the previous cooking to the start of the present cooking, the "on" period of the switching element and accordingly, the magnetron anode current may be compensated so that the high frequency power is maintained at the predetermined value.

The high frequency heating apparatus may further comprise a non-volatile memory sequentially storing data of an elapsed time from the completion of the previous cooking operation. Consequently, the elapsed time can be measured even when a momentary failure of electric power supply occurs during the time measuring operation by the timing means.

The high frequency heating apparatus may further comprise a power switching section switching a high frequency power from the magnetron, the power switching section being provided with a predetermined switching period in which the high frequency power is switched gradually or by degrees so as to reach an objective value. Consequently, the magnetron filament voltage drop may be reduced and the magnetron filament voltage can be prevented from dropping to a value in an unstable operation range below the operable lower limit voltage.

A winding number-of-turn selection section may be provided at the step-up transformer primary side for selecting a turn ratio in accordance with a value of the commercial power supply voltage. Even when the commercial power supply voltage is switched, for example, from 100 V to 200 V, the turn ratio is varied such that the increase in the secondary side output voltage of the step-up transformer is restricted. Consequently, the increase in the switching frequency of the switching element or the increase in the switching loss may be restricted.

The invention may be practiced as a high frequency heating apparatus comprising an input current detection section detecting an input current to the frequency conversion section and control means for controlling the "on" period of the switching element in response to a detection signal from the input current detection section so that the input current to the frequency conversion section is maintained at a predetermined value, thereby stabilizing a high frequency power produced from the magnetron against different commercial power supplies.

Furthermore, the high frequency heating apparatus may further comprise an induction heating source excited by a high frequency current from the frequency conversion section, in addition to the magnetron. In this arrangement, heating mode selecting means may be provided for selecting one of the step-up transformer and the induction heating source, thereby supplying the frequency conversion section output to the selected one. The user may select either the high frequency heating or the induction heating, at his or her discretion, which enhances convenience of the apparatus.

The invention may be further practiced as a high frequency heating apparatus comprising control means provided with first and second predetermined values each selected in accordance with a value of a commercial power supply voltage. The control means controls an "on" period of the switching element by comparing a detection signal from the anode current detection circuit with the selected one of the first and second predetermined values so that the magnetron anode current is maintained approximately at a predetermined value corresponding to the selected one of the first and second predetermined values.

The high frequency power from the magnetron is switched between two modes in accordance with the value of the commercial power supply voltage and is stabilized at two output values. The input current can be prevented from exceeding an allowable current value for the domestic wiring when the power supply voltage drops. In this case, a display device may be provided for displaying a high frequency power corresponding to the selected one of the first and second predetermined values with selection thereof.

Furthermore, the step-up transformer may be provided with secondary windings for securing power supplies for a fan motor for cooling the magnetron and other associated electrical equipments. In this respect, the associated electrical equipments need not be replaced with those in accordance with the value of the commercial power supply voltage.

Other objects of the present invention will become obvious upon understanding of the illustrative embodiments about to be described or will be indicated in the appended claims. Various advantages not referred to herein will occur to one skilled in the art upon employment of the invention in practice.

DESCRIPTION OF THE PREFERRED EMBODIMENTS

Figure 1:
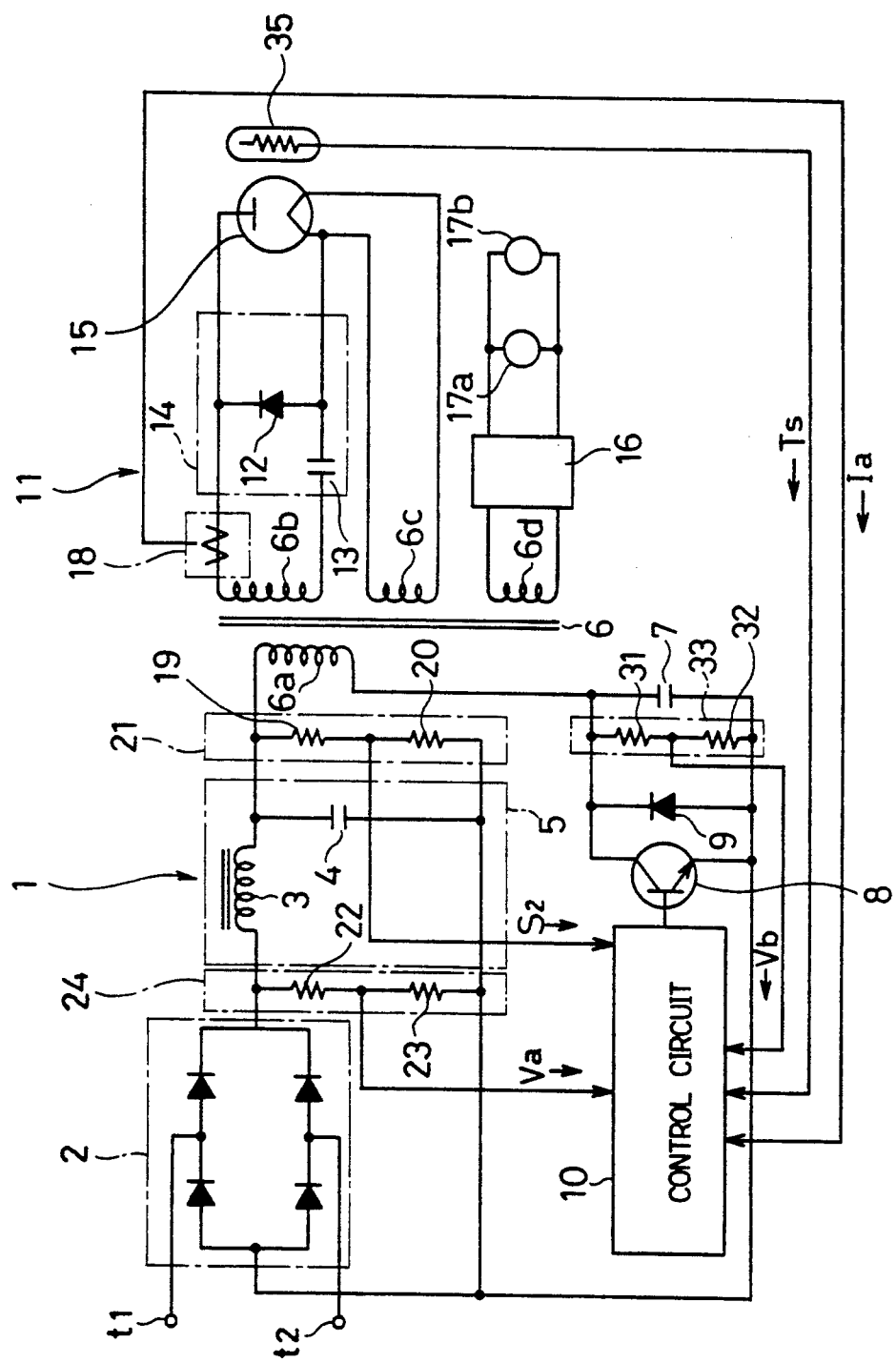
FIG. 1 is a circuit diagram illustrating an electrical arrangement of a high frequency heating apparatus of a first embodiment of the invention.

The high frequency heating apparatus of a first embodiment in accordance with the present invention will be described with reference to FIGS. 1 to 11 of the drawings. Reference numeral 1 designates a frequency conversion section converting a commercial power supply frequency to high frequency waves. The frequency conversion section 1 includes a rectification circuit 2 full-wave rectifying an AC voltage of a commercial power supply connected to terminals t1 and t2 and a filter 5 for smoothing the full-wave rectified voltage to thereby obtain a DC voltage. The filter 5 comprises a choke coil 3 and a capacitor 4. An oscillation circuit for the frequency conversion comprises a primary winding 6a of a step-up transformer 6, a resonance capacitor 7, a switching transistor 8 serving as a switching element and a diode 9. The switching transistor 8 is on-off controlled by a control circuit 10, so that a high frequency current is induced in the primary winding 6a of the step-up transformer 6. Consequently, in a magnetron drive section 11, high frequency voltages are induced in three secondary windings 6b, 6c and 6d. The high frequency voltage induced in the secondary winding 6b is applied across an anode and a cathode of a magnetron 15 through a voltage doubler rectification circuit 14 comprising a diode 12 and a smoothing capacitor 13. The voltage induced in the secondary winding 6c is applied to the anode of the magnetron 15 and the voltage induced in the secondary winding 6d is supplied to another rectification circuit 16. A DC voltage produced from the rectification circuit 16 is utilized as a DC source for a fan motor 17a for cooling the magnetron 15, a pilot lamp 17b and other associated electrical equipments. An anode current detection circuit 18 comprising a current transformer is provided at the magnetron 15 anode side. A conduction timing detection circuit 21 composed of a voltage divider circuit comprising resistances 19 and 20 is connected in parallel with the primary winding 6a of the step-up transformer 6. For the purpose of detecting the magnitude of the commercial power supply connected between the terminals t1, t2, a voltage detection section 24 composed of a resistive voltage divider circuit comprising resistances 22 and 23 is connected at the DC output side of the rectification circuit 2.

Figure 2:
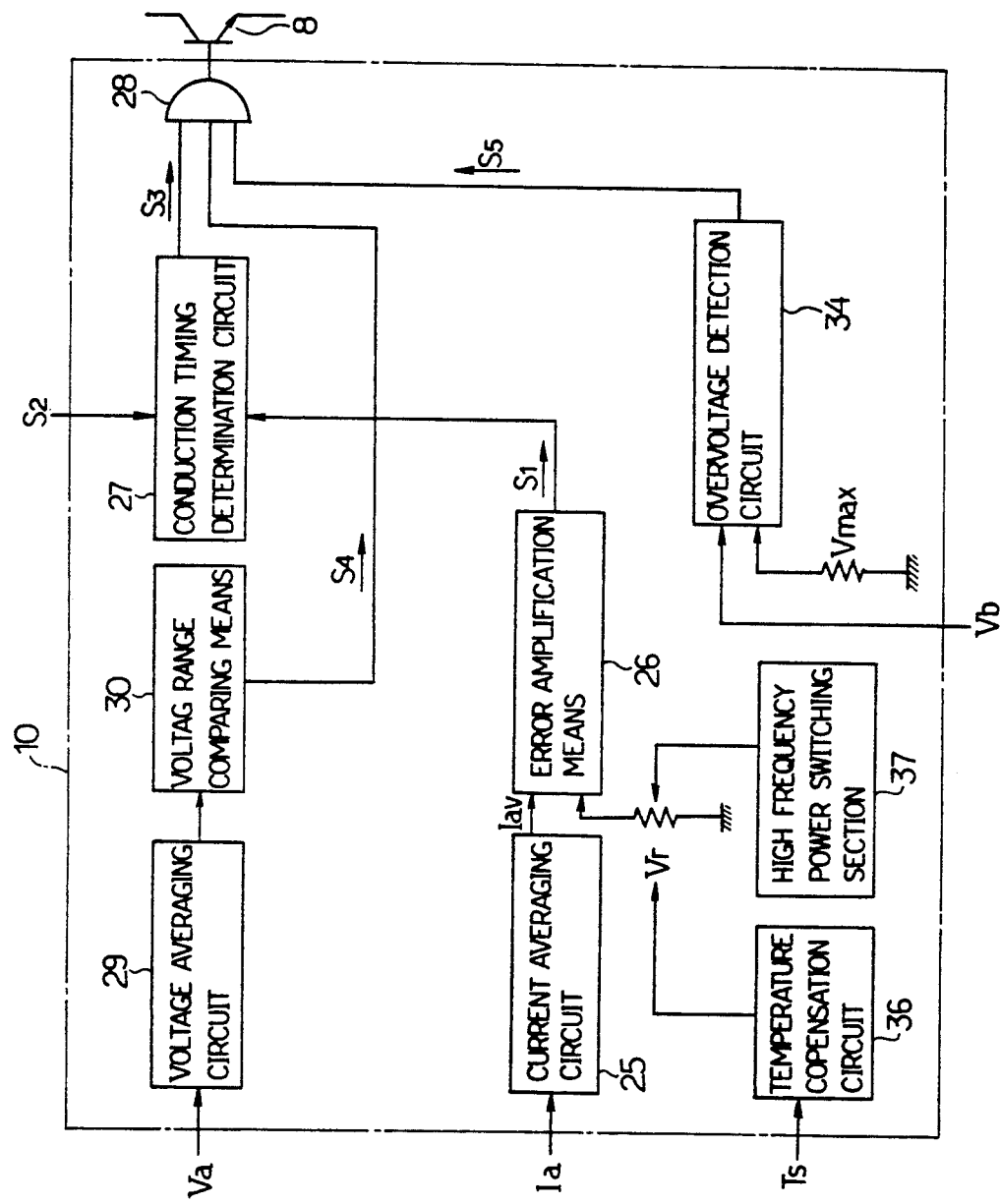
FIG. 2 is a block diagram of a control circuit shown in FIG. 1.
Figure 3:
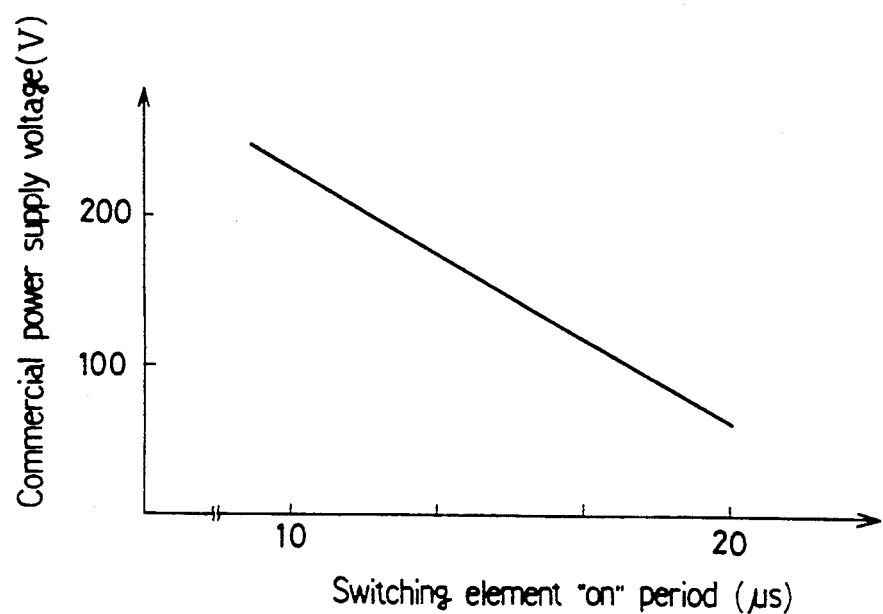
FIG. 3 is a graph showing a relationship between the commercial power supply voltage and the "on" period of the switching element.

The arrangement of the control circuit 10 on-off controlling the switching transistor 8 will now be described with reference to FIG. 2. A detection current $I_a$ from the anode current detection circuit 18 is rectified and smoothed with respect to one cycle thereof by a current averaging circuit 25 and the value of an averaged anode current is compared with a reference value $V_r$ by error amplification means 26. A difference signal $S_1$ between the averaged anode current value and the reference value $V_r$ is supplied to a conduction timing determination circuit 27 composing control means together with the error amplification means 26. The conduction timing determination circuit 27 is provided for determining the conduction start time and "on" period of the switching transistor 8. Based on a voltage waveform signal $S_2$ from the conduction timing detection circuit 21, the conduction timing determination circuit 27 generates a base signal $S_3$ in a predetermined timing. The base signal $S_3$ is supplied to the base of the switching transistor 8 via an AND gate 28.

A detection signal from the voltage detection section 24 is rectified and smoothed with respect to one cycle thereof by a voltage averaging circuit 29 to be thereby averaged. The value of an averaged voltage is supplied to a voltage range comparing means 30, which determines as to whether the commercial power supply voltage is in a predetermined range, for example, in the range between 80 V and 260 V in the embodiment, based on the supplied averaged voltage. When determining that the commercial power supply voltage is out of the predetermined range, the voltage range comparing means 30 generates a prohibition signal $S_4$ (low level signal) so that the AND gate 28 is rendered non-conductive.

To detect the voltage applied to the switching transistor 8, two resistances 31 and 32 are connected in parallel with the resonance capacitor 7 so as to compose a voltage detection section 33. The voltage $V_b$ detected by the voltage detection section 33 or produced from a common connection of the resistances 31, 32 is supplied to an overvoltage detection circuit 34 (see FIG. 2) in which the voltage $V_b$ is compared with a reference voltage $V_{max}$ corresponding to an allowable voltage (see FIG. 7) of the switching transistor 8. When the detection voltage $V_b$ exceeds the reference voltage $V_{max}$, the overvoltage detection circuit 34 generates a low level interruption signal $S_5$ which is supplied to the AND gate 28 such that the AND gate 28 is rendered non-conductive. Consequently, the energization of the magnetron 15 is interrupted. In this case, generation of the interruption signal $S_5$ is continued for a predetermined period, for example, 10 seconds Thereafter, the signal $S_5$ generation is stopped and the magnetron 15 is re-driven. When the number of the magnetron interruptions reaches a predetermined number, for example, 5, the overvoltage detection circuit 34 operates to continuously generate the interruption signal $S_5$ until a power supply switch (not shown) is turned off, whereby the magnetron 15 is prevented from being energized.

A magnetron temperature sensing section 35 comprising a thermistor is provided in the vicinity of the magnetron 15 for sensing the temperature of the magnetron anode, as shown in FIG. 1. Based on a temperature signal $T_s$ generated by the magnetron temperature sensing section 35, a temperature compensation circuit 36 (see FIG. 2) of the control circuit 10 operates to compensate the reference value $V_r$ of the error amplification means 26, as will be described later. A magnetron 15 anode current is increased with the increase of the reference value $V_r$. Furthermore, in the embodiment, when the temperature sensed by the magnetron temperature sensing section 35 exceeds a preselected upper limit value, the temperature compensation circuit 36 operates to reduce the reference value $V_r$ of the error amplification means 26 to its lower limit value, thereby reducing the high frequency power to the lower limit value.

The control circuit 10 is provided with a power switching section 37 (see FIG. 2) for the purpose of switching the high frequency power of the magnetron 15. The high frequency power switching section 37 has a predetermined switching period (30 seconds, for example) during which period the reference value $V_r$ (voltage) of the error amplification means 26 is gradually switched so that the high frequency power of the magnetron 15 is gradually switched to an objective value. For example, the reference value $V_r$ is switched to 3.5 V when the high frequency power is at 700 W and to 1 V when at 200 W.

Figure 4:
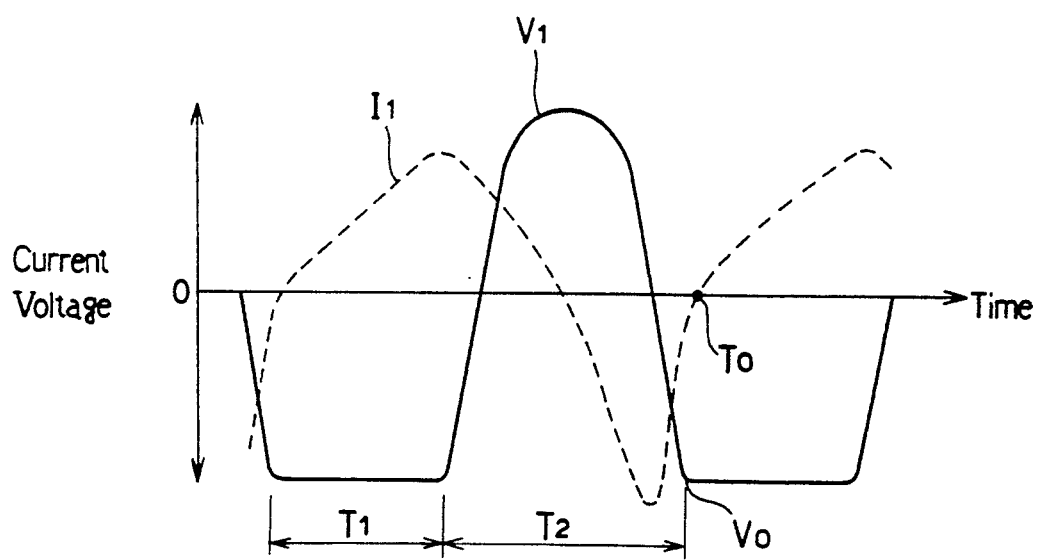
FIG. 4 is a graph showing changes of the high frequency voltage and current at the primary winding of the step-up transformer.

The operation of the high frequency heating apparatus thus arranged will be described. An oscillation current flows into an oscillation circuit comprising the step-up transformer primary winding 6a and the resonance capacitor 7 as the result of on-off control of the switching transistor 8. FIG. 4 shows a high frequency voltage $V_1$ and a high frequency current $I_1$ both induced in the primary winding 6a in the case where the oscillation current flows into the oscillation circuit. Such a high frequency voltage $V_1$ is further stepped up by the transformer 6 and then, is supplied to the magnetron 15, which is driven The "on" period $T_1$ of the switching transistor 8 is force controlled by the gate signal $S_1$ so as to be in accordance with the value of the commercial power supply voltage in the frequency converting operation as described above, while the non-conductive period $T_2$ of the switching transistor 8 is determined by energy charged in an inductance the step-up transformer 6 has and the capacity of the resonance capacitor 7. More specifically, the non-conductive period of the switching transistor 8 is limited by a time $T_0$ at which the high frequency current $I_1$ is reduced approximately to zero. The time $T_0$ is also a start time of the next cycle of conduction. The conduction timing determination circuit 27 usually receives the voltage waveform signals $S_2$ of the high frequency voltage $V_1$ from the timing detection circuit 21 and determines the timing $T_0$ for reducing the high frequency current to zero, thereby obtaining the timing of the gate signal $S_3$ generation.

The detection current from the anode current detection circuit 18 or the average anode current value from the current averaging circuit 25 is supplied to the error amplification means 26. The average current value is compared with the reference value $V_r$ and the difference signal $S_1$ therebetween is generated by the error amplification means 26. The difference signal $S_1$ takes a value larger as the commercial power supply voltage applied across the terminals t1, t2 is increased. The conduction timing determination circuit 27 controls the period of the base signal $S_4$ so that the conduction period of the switching transistor 8 is rendered shorter as the magnitude of the difference signal $S_1$ is increased Consequently, since the switching transistor 8 conduction period is rendered shorter as the power supply voltage is raised, the anode current is restrained from increasing with the voltage raise. That is, the anode current is controlled so as to be decreased as the power supply voltage is rendered higher and increased as the power supply voltage is rendered lower. Accordingly, even when the commercial voltage applied across the terminals t1, t2 is switched, for example, between 100 V and 200 V because of the user's removal from one region to another or fault of connection, the anode current of the magnetron 15 is controlled to be maintained at a predetermined value. Since the secondary winding 6d output voltage is not varied so much, the fan motor 17a and pilot lamp 17b need not be replaced in accordance with the change of the commercial power supply voltage. Furthermore, in parallel with the above-described anode current control, the detection voltage $V_a$ from the voltage detection section 24 is supplied to the voltage range comparison means 30 via the voltage averaging circuit 29. When the power supply voltage is out of the range between 80 V and 260 V, the interruption signal $S_4$ is generated by the voltage range comparison means 30 so that the AND gate 28 is cut off to interrupt the on-off operation of the switching transistor 8, thereby deenergizing the magnetron 15. The lower and upper limit values of the voltage range are determined in consideration with the following facts: The anode current of the magnetron 15 is extremely increased when the voltage drops below 80 V and 200 V is the upper limit of a withstand voltage of the magnetron 15. Consequently, the circuit elements can be protected against the extremely high or low power supply voltage.

Upon initiation of oscillation of the magnetron 15, the anode temperature and anode voltage change and accordingly, are not stable. As a result, the operation of the magnetron 15 tends to be unstable. The magnetron anode current flow is alternately allowed and stopped, which induces an abnormal voltage in the voltage doubler rectification circuit 14 provided at the secondary side of the step-up transformer 6. Such a phenomenon can be usually seen when the capability of the magnetron to emit electrons is lowered. Furthermore, the similar abnormal voltage is induced when a discharge occurs in the voltage doubler rectification circuit 14. An influence of such an abnormal voltage extends to the switching transistor 8 of the frequency conversion section 1 provided at the primary side of the step-up transformer 6 and consequently, the abnormal voltage is applied to the switching transistor 8. See FIG. 7.

In the embodiment, the voltage applied to the switching transistor 8 is detected by the voltage detection section 33 during the operation of the magnetron 15. The detection voltage $V_b$ from the voltage detection section 33 is supplied to the overvoltage detection circuit 34 to be compared with the reference voltage $V_{max}$ corresponding to the allowable voltage (see FIG. 7) of the switching transistor 8. When the detection voltage $V_b$ exceeds the reference voltage $V_{max}$ or when the abnormal voltage is induced, the overvoltage detection circuit 34 generates a low level interruption signal $S_5$, which signal is supplied to the AND gate 28. The AND gate 28 is thus rendered non-conductive such that the magnetron 15 is interrupted. Consequently, the state that the magnetron 15 is unstable can be restricted to a minimum period and accordingly, the magnetron 15 and circuits can be protected, resulting in improvement in the life and reliability of these parts. Furthermore, since almost no abnormal voltage is applied to the switching transistor 8, the allowable voltage of the switching transistor 8 may be reduced, resulting in the cost reduction.

The interruption signal $S_5$ is continuously produced from the overvoltage detection circuit 34 for a predetermined period (10 seconds, for example) and then, the output of the interruption signal $S_5$ is interrupted such that the AND gate 28 is rendered conductive to re-energize the magnetron 15. Thus, if the abnormal voltage should be mistakenly detected because of the electrical noise or the like or if the operation of the magnetron 15 should temporally become unstable, the magnetron 15 is re-operated thereafter and the operation thereof can be continued when the state of the magnetron 15 becomes stable. Thus, the influences of the false detection and unstable operation can be eliminated, resulting in improvement of the operation reliability.

When the number of the magnetron 15 interrupting operations reaches a predetermined number, for example, 5, the overvoltage detection circuit 34 continuously produces the interruption signal $S_5$ thereafter until the power supply switch (not shown) is turned off. Thus, the AND gate 28 is maintained at the non-conductive state and therefore, the magnetron 15 is not re-operated. Consequently, the magnetron 15 may be prevented from being alternately re-energized and deenergized uselessly at the occurrence of the abnormal condition.

Figure 5:
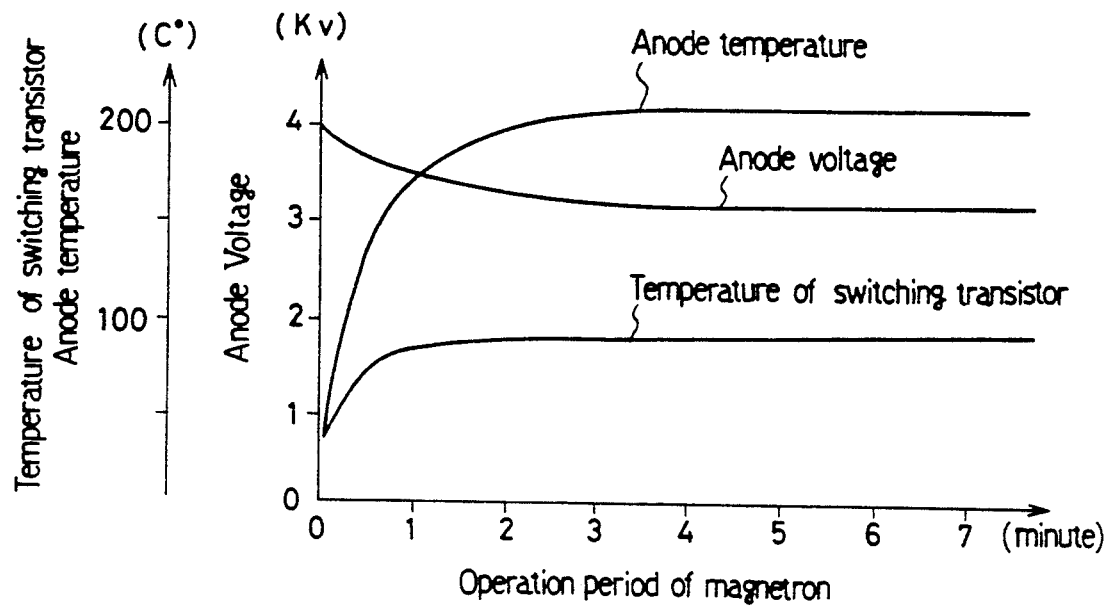
FIG. 5 is a graph showing changes of the magnetron anode temperature, anode voltage and switching transistor temperature.
Figure 6:
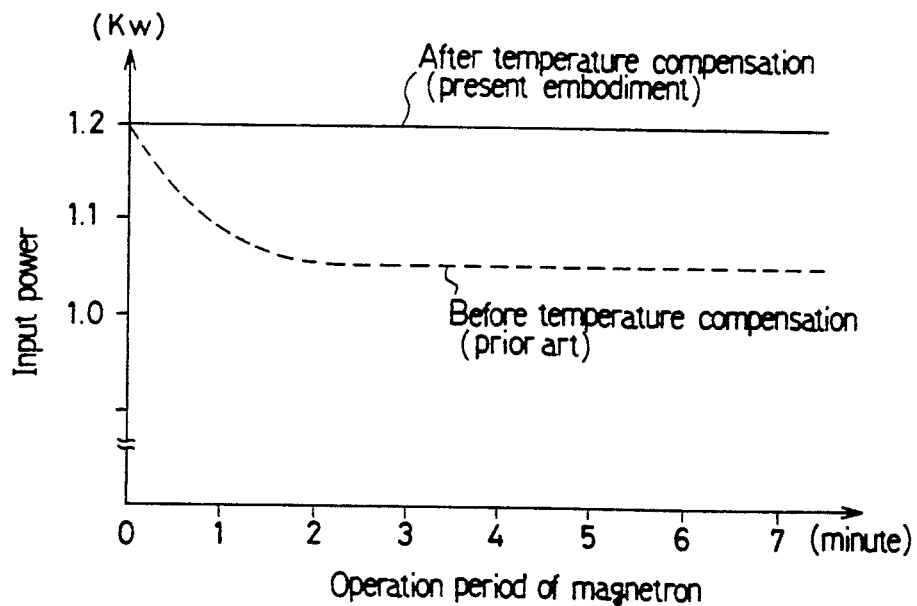
FIG. 6 is a graph showing changes of the input power.
Figure 7:
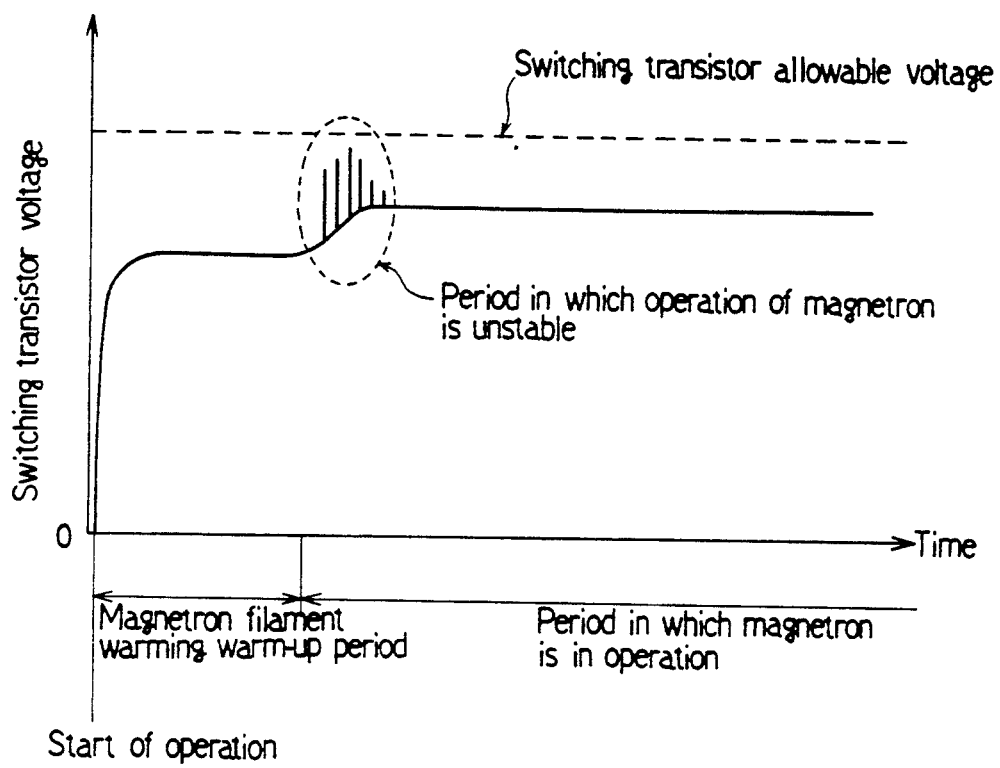
FIG. 7 is a graph showing changes of the switching transistor voltage.

The anode temperature is increased as shown in FIG. 5 with a lapse of operation of the magnetron 15. The increase in the anode temperature demagnetizes a magnet of the magnetron 15 (usually a ferrite magnet), which reduces the magnetic fields between anode and cathode, resulting in drop of the anode voltage. Accordingly, when the anode current is controlled to be maintained at a predetermined value regardless of variations of the anode temperature, the input power is reduced with raise of the anode temperature (drop of the anode voltage) as shown by a dotted line in FIG. 6, which causes reduction of the high frequency power, resulting in reduction of the heating power. Accordingly, even when the cooking periods are the same, the gross calorific value of food being cooked differs from a case where the magnetron 15 is cool to another case where the magnetron temperature is high, resulting in variations in the degree of the cooking.

In the embodiment, the anode temperature is sensed by the magnetron temperature sensing section 35 upon initiation of the operation of the magnetron 15. The reference value $V_r$ of the error amplification means 26 is increased by the temperature compensation circuit 36 in order that the anode current is increased so that the drop of the anode voltage with the temperature raise is compensated when the detected temperature is increased. Consequently, the conduction period of the switching transistor 8 is increased, whereby the input power and accordingly, the high frequency power is maintained at a predetermined value, as shown by a solid line in FIG. 6. As the result of such a control manner, the high frequency power (heating power) can be maintained at the predetermined value regardless of the variations in the magnetron temperature with a lapse of the operation of the magnetron 15, thereby securing a uniform cooking.

On the other hand, when the temperature detected by the magnetron temperature sensing section 35 exceeds a predetermined upper limit, the temperature compensation circuit 32 operates to reduce the reference value $V_r$ of the error amplification means 26 to the lower limit so that the high frequency power is reduced to its lower limit. Consequently, the magnetron 15 can be prevented from being overheated.

Although, in the embodiment, the high frequency power is reduced when the temperature detected by the magnetron temperature sensing section 35 exceeds the upper limit, the magnetron 15 may be interrupted instead.

Figure 10:
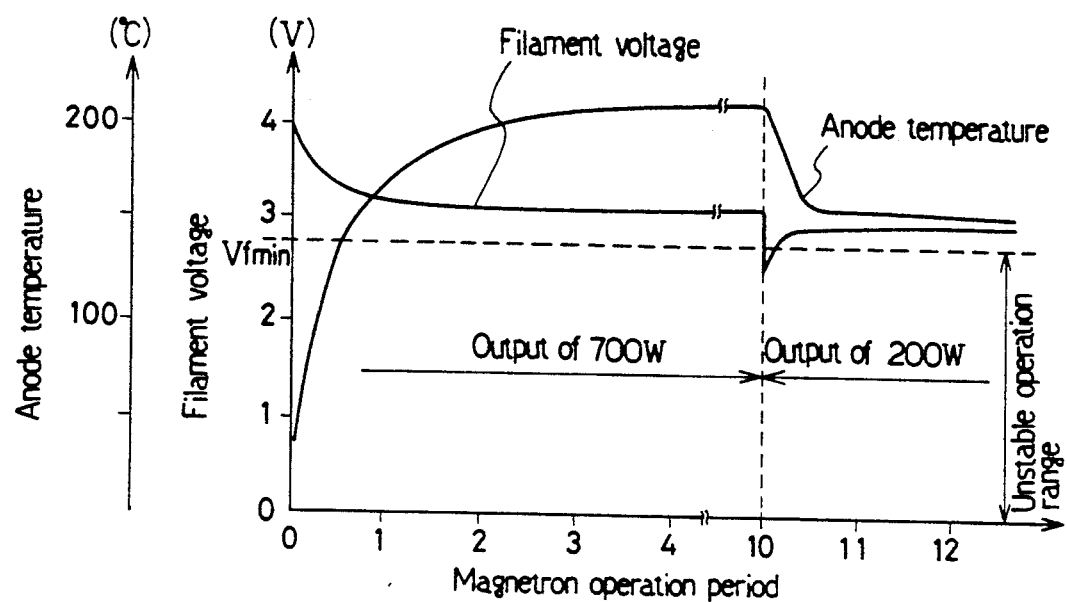
FIG. 10 is a view similar to FIG. 9 showing the case of a conventional arrangement.
Figure 11:
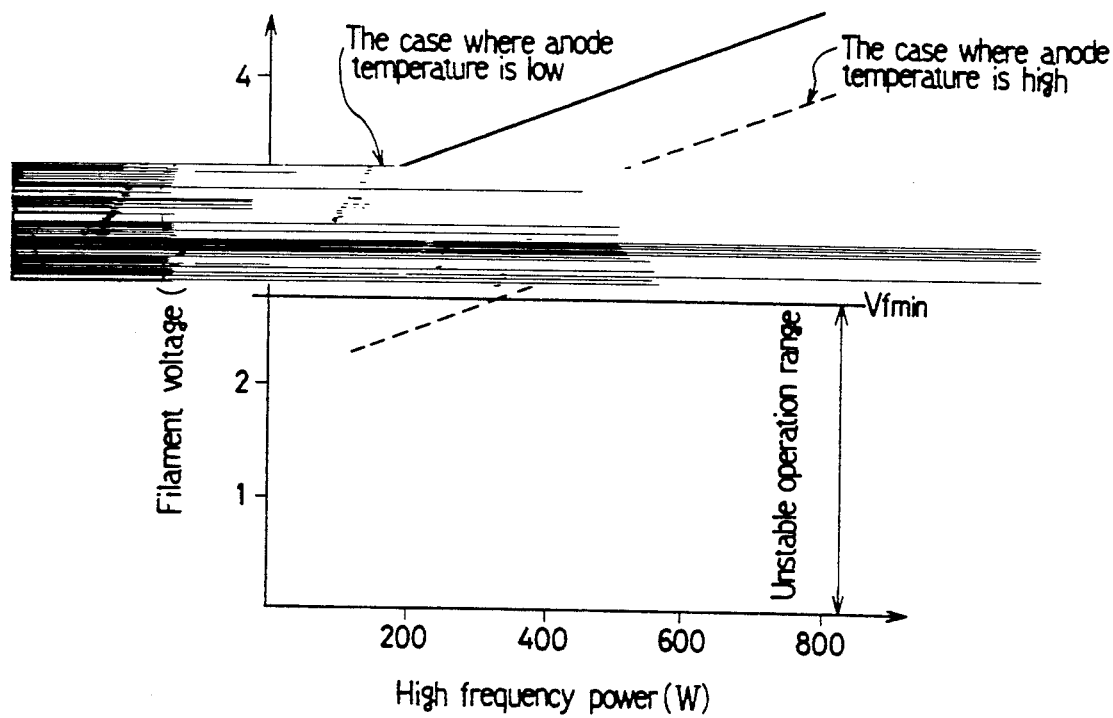
FIG. 11 is a graph showing a relationship between the high frequency power and each of the filament voltage and the anode temperature.

Now, consider the case where the heating operation is performed at the high power, for example, 700 W in a first half of the cooking and thereafter, the power is switched to the low power, for example, 200 W. In this respect, when the power is switched from 700 W to 200 W at a stroke, an anode filament voltage of the magnetron 15 drops below an operable lower limit voltage $V_{fmin}$ immediately after the switching, as shown in FIG. 10 and consequently, the operation of the magnetron 15 temporally becomes unstable. The reason for this is that the anode filament voltage has a characteristic that it drops when the anode temperature is high, as shown in FIG. 11. More specifically, the anode temperature is still high because of a remaining heat immediately after the switching of the power from 700 W to 200 W. The anode filament voltage drops to an unstable operation range below the operable lower limit voltage $V_{fmin}$ while the anode temperature is decreased to some extent by heat radiation, as shown by a dotted line in FIG. 11. When the magnetron 15 reiteratively runs into such a condition of unstable operation, the anode filament is damaged. Consequently, the life of the magnetron 15 is reduced and the circuit elements such as the switching transistor 8 undergo an extremely large thermal stress, which reduces the life and reliability of the circuit.

Figure 8:
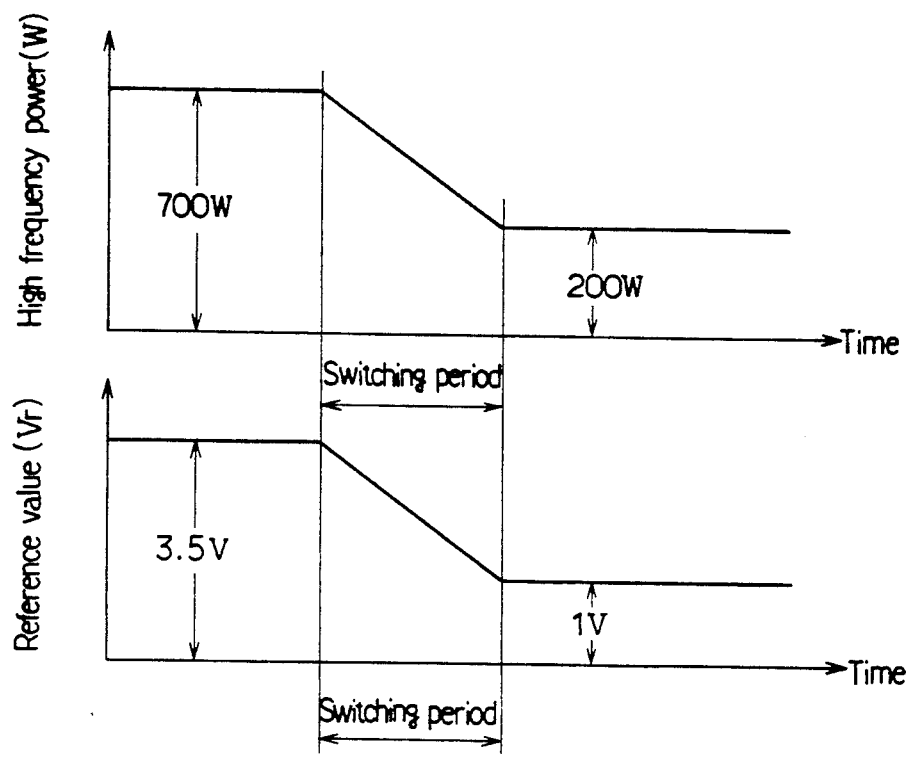
FIG. 8 is a graph showing changes of the high frequency power and a reference value $V_r$ when the high frequency power is switched from 700 W to 200 W.
Figure 9:
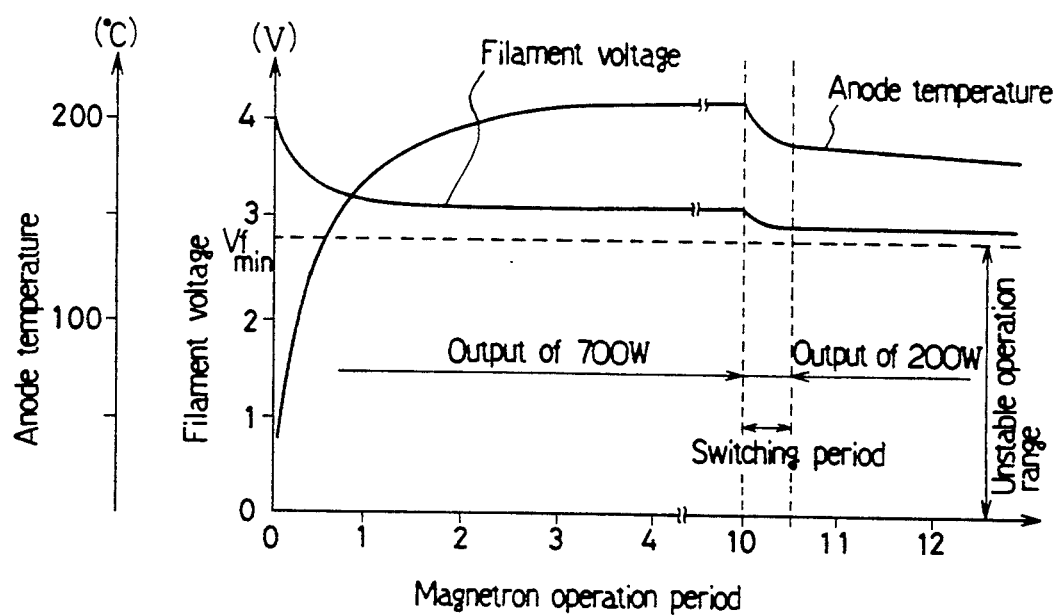
FIG. 9 is a graph showing changes of a filament voltage and the anode temperature.

In the embodiment, when the power is switched from 700 W to 200 W in the midst of the cooking, the reference value $V_r$ of the error amplification means 26 is set at 3.5 V by the power switching section 37 when the cooking is performed at the output power of 700 W. Thereafter, when the power is switched from 700 W to 200 W, the power is not switched to an objective value at a stroke as in the prior art but gradually switched such that the high frequency power gradually reaches the objective value (200 W) in a predetermined switching period, for example, 30 seconds as shown in FIG. 8. Such a switching operation is performed by gradually reducing the reference value $V_r$ of the error amplification means 26 from 3.5 V to 1 V in the switching period by the power switching section 37. Consequently, the magnetron 15 filament voltage is gradually reduced moderately in the above-mentioned switching period, following a gradual reduction of the filament voltage. Thus, the drop of the filament voltage is restricted so as not to be decreased to the range of of the unstable operation below the operable lower limit voltage $V_{fmin}$. Therefore, since the operation of the magnetron 15 is prevented from becoming unstable when the high frequency power level is switched, the life of the magnetron 15 is improved and the circuit elements such as the switching transistor 8 are not subjected to an extremely large thermal stress, resulting in improvement of life and reliability of the circuit.

Although the high frequency power is gradually (linearly) switched in the switching period in the above-described embodiment, it may be changed with several phases Furthermore, the switching range should not be limited to that between 700 W and 200 W. The switching period should not be limited to 30 seconds, either. It may be 20 or 40 seconds.

Figure 12:
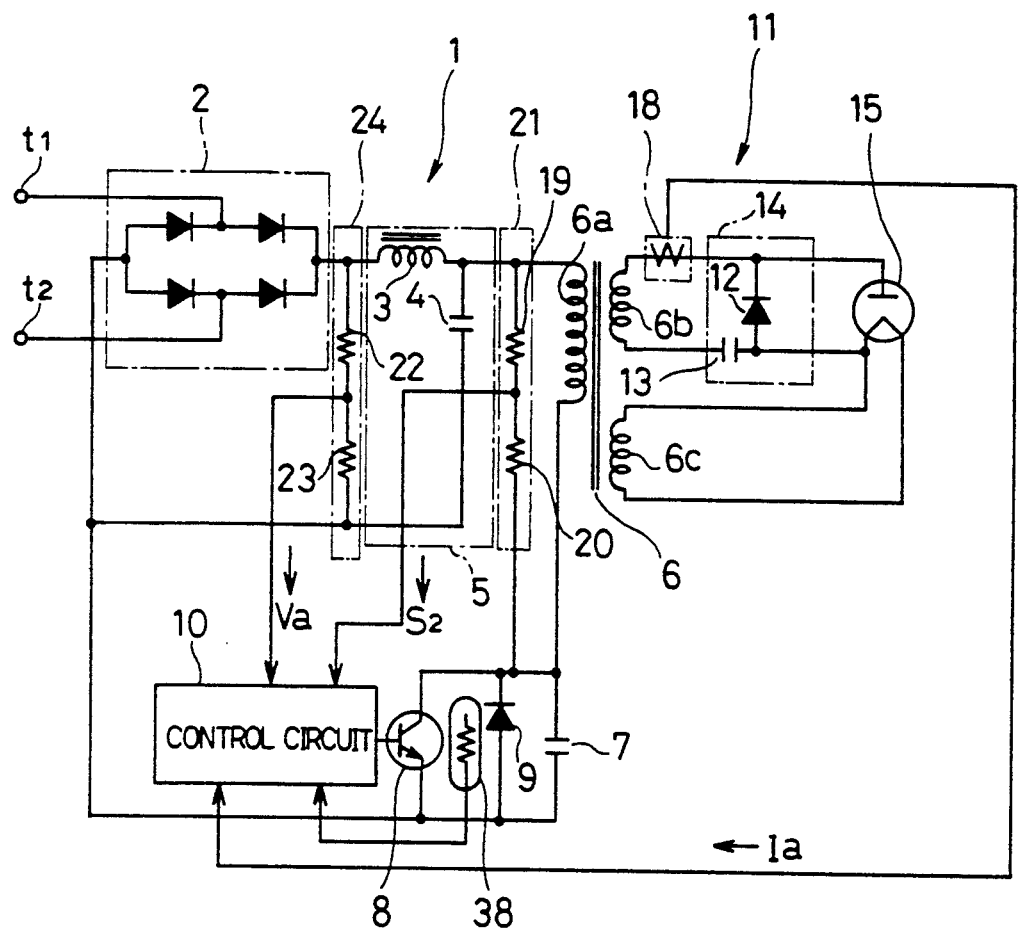
FIG. 12 is an electrical circuit diagram illustrating the electrical arrangement of the high frequency heating apparatus of a second embodiment.
Figure 13:
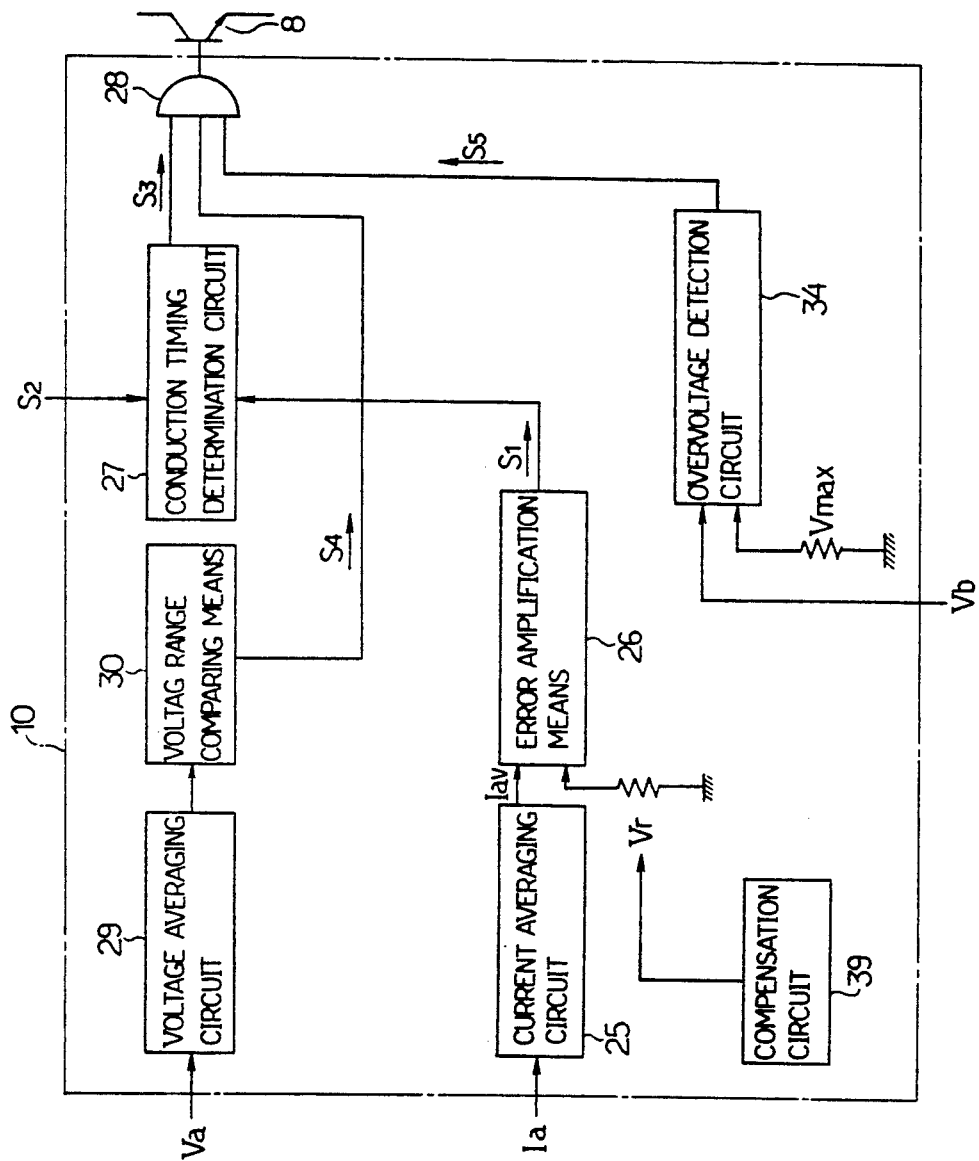
FIG. 13 is a block diagram of the control circuit employed in the high frequency heating apparatus of a third embodiment.
Figure 14:
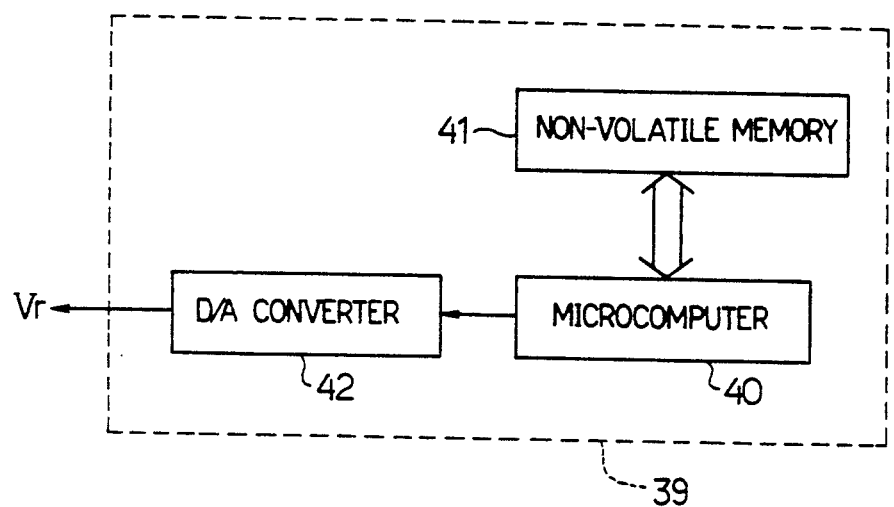
FIG. 14 is a block diagram of a compensation circuit.

The changes of the magnetron 15 anode temperature has a relationship with those of the switching transistor 8 temperature and vice versa as shown in FIG. 5. Accordingly, the high frequency power can be maintained at a predetermined value by compensating the "on" period of the switching transistor 8 in accordance with the sensed temperature thereof More specifically, as shown in FIG. 12 as a second embodiment, a circuit element temperature sensing section 38 such as a thermistor is provided in the vicinity of the switching transistor 8. Based on the switching transistor temperature sensed by the circuit element temperature sensing section 38, the reference value $V_r$ of the error amplification means 26 is compensated in the same manner as in the previous embodiment, whereby the "on" period of the switching transistor 8 is controlled so that the input power is maintained at a predetermined value.

Also in the second embodiment, the switching transistor 8 is arranged so that the operation thereof is interrupted or the high frequency power therefrom is reduced when the temperature sensed by the circuit element temperature sensing section 38 exceeds a predetermined upper limit value. Consequently, the switching transistor 8 and the other circuit elements can be protected against an extremely large thermal stress.

Figure 15:
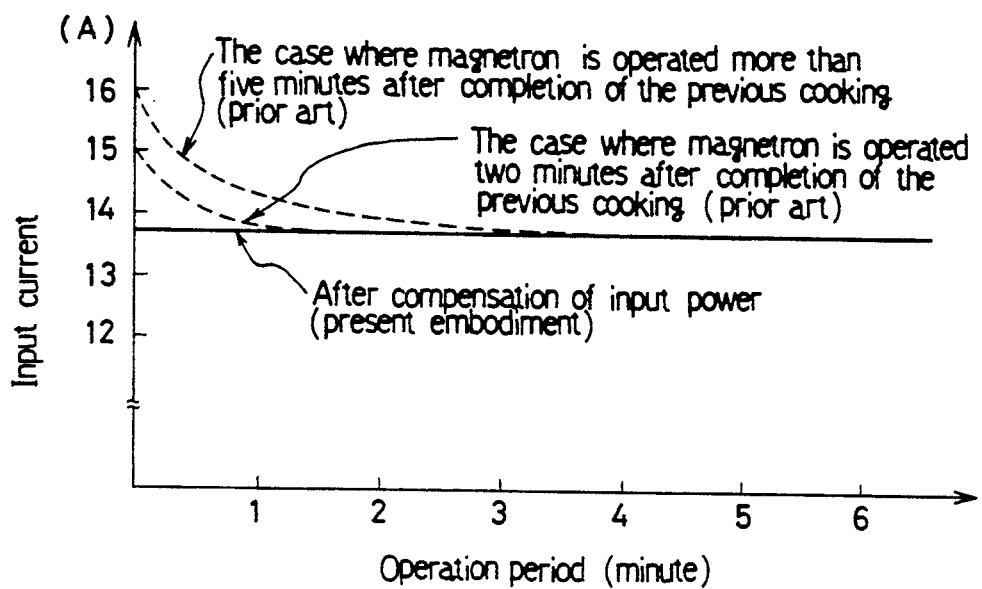
FIG. 15 is a graph showing changes of the input current after initiation of the cooking, in comparison with the prior art.

The initial temperature of the magnetron 15 at the time of start of the cooking differs in accordance with a lapse of time after the completion of the previous cooking. Accordingly, the mode of the magnetron 15 temperature increase thereafter also differs in cases. When the anode current (the reference value $V_r$ of the error amplification means 26) is controlled so as to be maintained at a predetermined value regardless of the changes in the magnetron 15 temperature, the differences in the magnetron 15 initial temperature due to the differences in the lapse of time after the completion of the previous cooking causes the input power (input current) or the high frequency power to be reduced or increased, as shown by the dotted lines in FIG. 15. Particularly, the input power (input current) and accordingly, the high frequency power at the time of start of the cooking tends to be extremely increased as the initial temperature of the magnetron 15 is decreased more and more.

Figure 16:
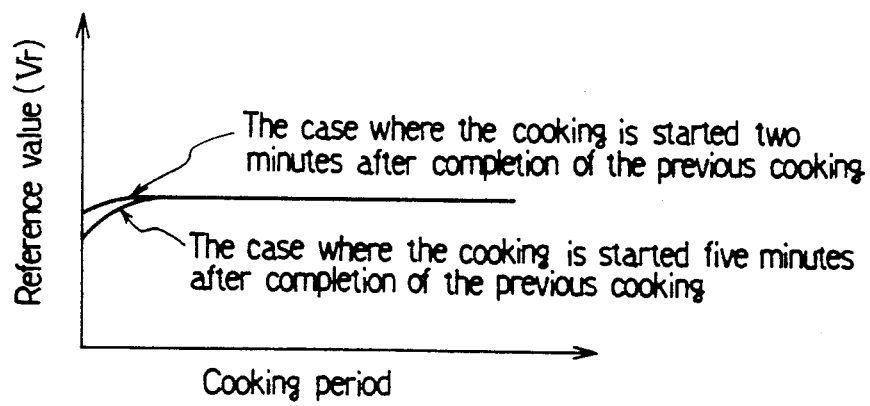
FIG. 16 illustrates a compensated curve of the reference value $V_r$ of error amplification means.
Figure 17:
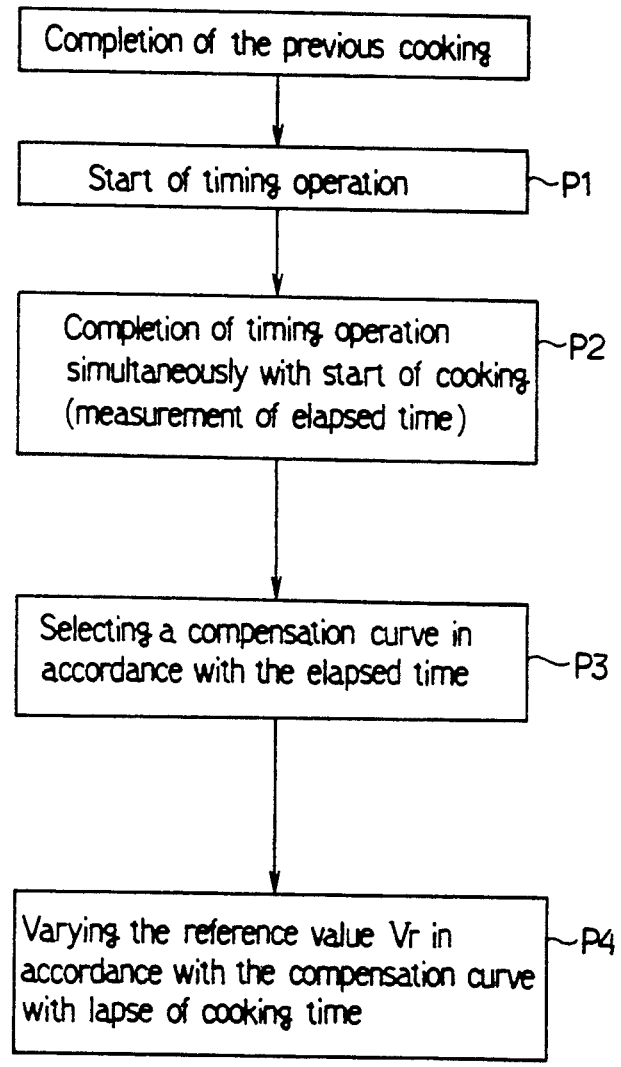
FIG. 17 is a flowchart explaining the procedure of compensating the reference value $V_r$ of the error amplification means.

To overcome the above-described disadvantage, the control circuit 10 is provided with a compensation circuit 39 in a third embodiment shown in FIGS. 13-17. The reference value $V_r$ of the error amplification means 26 is compensated by the compensation circuit 39 in accordance with the lapse of time after the completion of the previous cooking, as shown in FIG. 16. The compensation circuit 39 comprises a microcomputer 40, a non-volatile memory 41 accessed by the microcomputer 40, an analog-to-digital (D/A) converter 42 converting an output from the microcomputer 40 to an analog value. The microcomputer 40 also functions as timing means for measuring a lapse of time from the completion of the previous cooking to the start of the present cooking by starting counting clock pulses at the same time of the completion of the previous cooking. Based on the measured lapse of time, the microcomputer 40 operates to compensate the reference value $V_r$ of the error amplification means 26 in accordance with a control program shown in FIG. 17 such that the "on" period of the switching transistor 8 is compensated so that the input power is maintained at a predetermined value. This compensation operation will be summarized as follows. Data of compensation curves of the reference value $V_r$ is previously obtained from experiments. The data is stored in a ROM (not shown) of the microcomputer 40 and one of the compensation curves is selected in accordance with the lapse of time after the completion of the previous cooking. The "on" period of the switching transistor 8 is shortened when the reference value $V_r$ is decreased, thereby reducing the magnetron 15 anode current.

Since data of the lapse of time after the completion of the previous cooking is sequentially stored in the non-volatile memory 41, the time-counting operation can be successively performed based on the data stored in the non-volatile memory 41 even when a power failure momentarily occurs.

In accordance with the control program of the microcomputer 40 (see FIG. 17), the counting of the clock pulses is initiated at the same time that the previous cooking is completed and the lapse of time after the completion of the previous cooking is measured, at a step P1. Subsequently, the counting of the clock pulses is stopped upon start of the present cooking and the lapse of time from the completion of the previous cooking to the start of the present cooking is obtained, at a step P2. At a step P3, one of the compensation curves is selected from the data stored in the ROM in accordance with the measured lapse of time. Based on the selected compensation curve, the reference value $V_r$ of the error amplification means 26 is gradually increased with a lapse of the cooking period, as shown in FIG. 16, at a step P4. An increase ratio of the error amplification means 26 is reduced with the lapse of the cooking period since the magnetron 15 temperature approaches an approximately fixed value with a lapse of time. This control manner increases the reference value $V_r$ as the anode voltage drops owing to the increase in the magnetron 15 temperature. Thus, the "on" period of the switching transistor 8 is lengthened so that the anode current is increased, thereby maintaining the high frequency power at the predetermined value.

As described above, the reference value $V_r$ of the error amplification means 26 and accordingly, the "on" period of the switching transistor 8 is compensated based on the compensation curve selected in accordance with the lapse of time after the completion of the previous cooking. Consequently, the high frequency power can be maintained at the predetermined value, whereby the cooking can be unformed.

Furthermore, since the data of the lapse of time after the completion of the previous cooking is sequentially stored in the non-volatile memory 41, the time measuring operation can be successively performed based on the data stored in the non-volatile memory 41 even when a power failure momentarily occurs. Consequently, the operation for compensating the reference value $V_r$ is performed exactly even when the power failure momentarily occurs, thereby improving the reliability of the operation of the apparatus.

Figure 18:
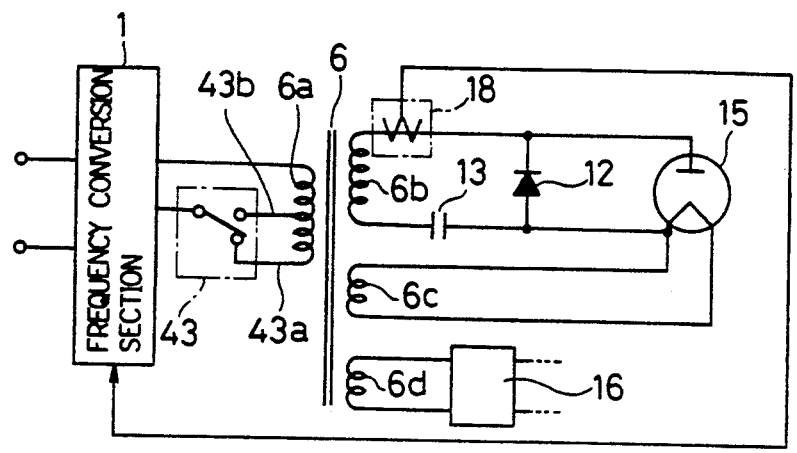
FIG. 18 is an electrical circuit diagram of the electrical arrangement of the high frequency heating apparatus of a fourth embodiment.

FIG. 18 shows a fourth embodiment of the invention. Reference numeral 43 designates a turn selecting switch serving as a turn selecting section provided at the primary side of the transformer 6 for automatically selecting one of taps 43a and 43b so that the number of turns of the primary winding 6a is increased when the commercial power supply voltage is high (200 V, for example) and reduced when the commercial power supply voltage is low (100 V, for example). In the first embodiment, since the "on" period of the switching transistor 8 is shortened as the commercial power supply voltage is high, the switching frequency is also increased and accordingly, the switching loss is increased, which renders the radiation fins large-sized. In the fourth embodiment, however, even when the commercial power supply voltage is raised to, for example, 200 V, the high tap 43a is selected by the turn selecting switch 43 such that the turn ratio of the transformer 6 is reduced, thereby restricting the secondary output voltage to a low value. Consequently, since the limitation to the amount of the anode current is eased, the increase in the switching frequency or the switching transistor 8 is restricted.

Figure 19:
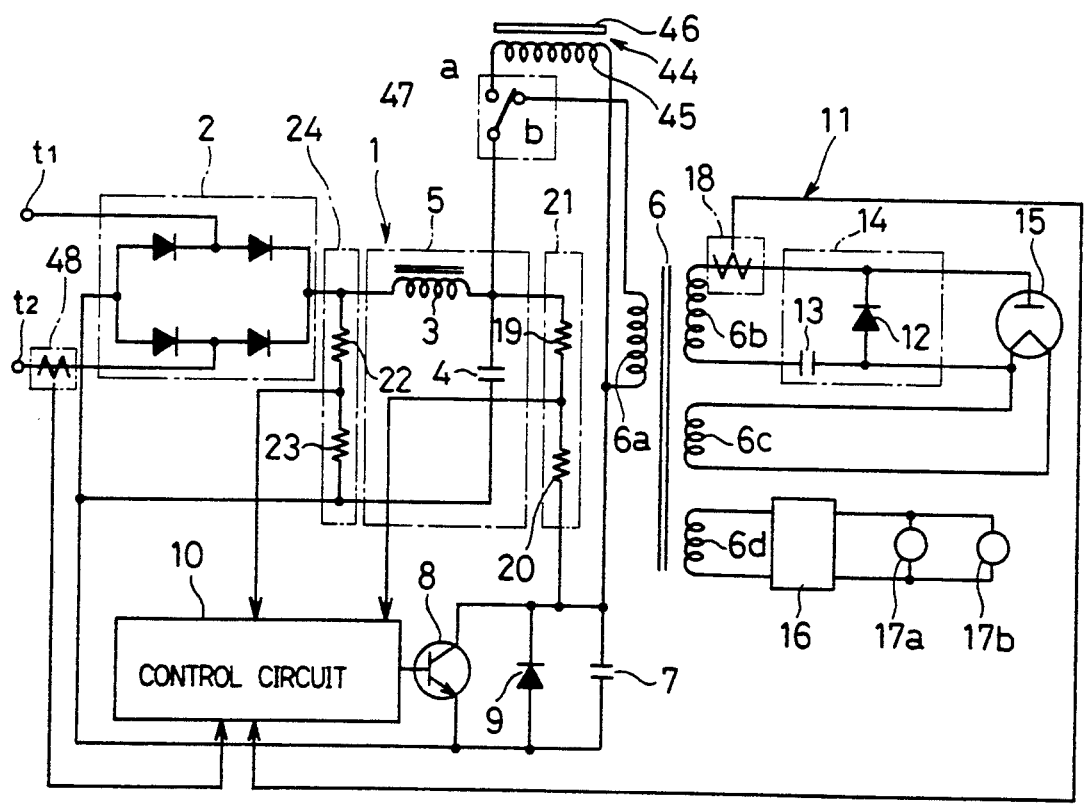
FIG. 19 is an electrical circuit diagram of the electrical arrangement of the high frequency heating apparatus of a fifth embodiment.

FIG. 19 shows a fifth embodiment of the invention. Reference numeral 44 designates an induction heating source comprising an induction coil 45 and a heating plate 46 induction heated by a high frequency magnetic field induced by the induction coil 45. The induction heating source 44 is disposed on the top of a casing defining a high frequency heating chamber. When the heating plate 46 is induction heated, the ceiling plate defining the heating chamber is heated by the heating plate 46. The induction heating source 44 thus serves as a grill heater. A heating level selecting switch 47 serving as heating level selecting means is provided at the output side of the frequency conversion section 1. One of the primary winding 6a of the step-up transformer 6 and the induction coil 45 is selectively connected to the output side of the frequency conversion section 1 by the heating level selecting switch 47. An input current detecting section 48 comprising a current transformer is provided at the input side of the rectification circuit 2 for detecting an input current to the frequency conversion circuit 1.

In operation, in the case where the apparatus is used as a grill cooking apparatus employing the induction heating source, the selecting switch 47 is switched to the contact a and then, the frequency conversion section 1 is operated in the same manner as described above, whereby a high frequency current is supplied to the induction coil 45. The input current flowing into the frequency conversion section 1 during the induction heating operation is monitored by the error amplification means having the same circuit arrangement as that in the first embodiment and receiving a detected current from the input current detecting section 48. The "on" period of the switching transistor 8 is controlled in the same manner as described above so that the input current is not varied in accordance with the voltage of the commercial power supply connected between the terminals t1, t2. On the other hand, when the high frequency heating operation is performed, the selecting switch 47 is switched to the contact b. Although two separate error amplifiers for compensating the "on" period of the switching transistor 8 are provided for the induction heating source and the high frequency heating respectively in the embodiment, a single error amplification means in which the reference values are switched may be employed. Consequently, the "on" period of the switching transistor 8 is controlled so that the magnetron 15 anode current is approximately constant, based on the detection signal from the input current detecting section 48 provided at the input side of the frequency conversion section 1.

Figure 20:
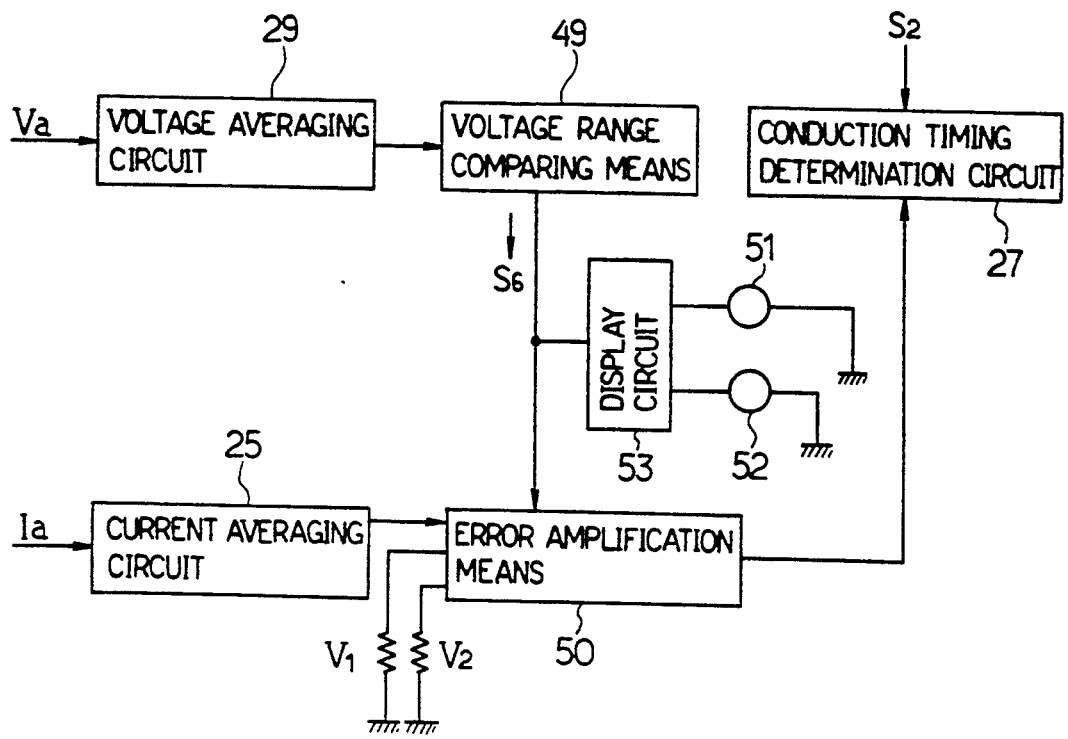
FIG. 20 is an electrical circuit diagram of the control circuit employed in the high frequency heating apparatus of a sixth embodiment.
Figure 21:
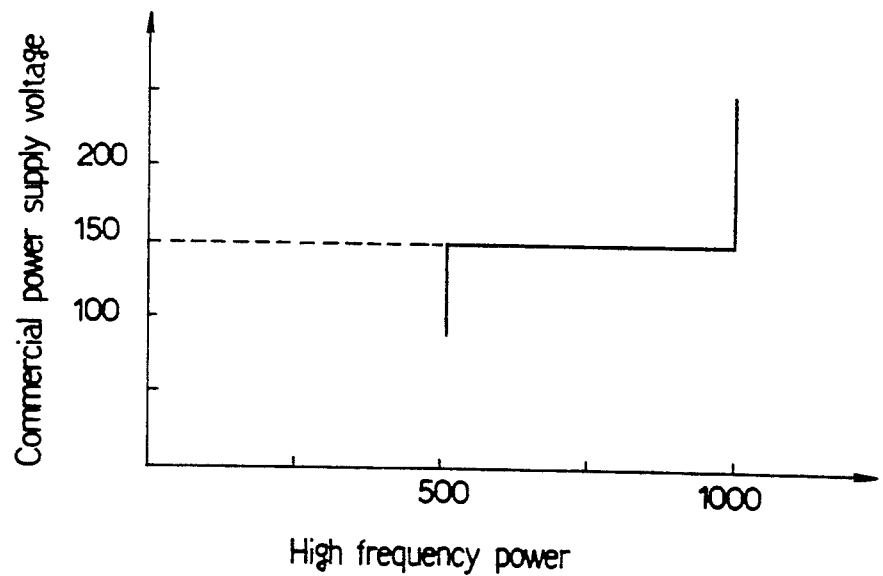
FIG. 21 is a graph showing the relationship between the commercial power supply voltage and the high frequency power.

FIGS. 20 and 21 illustrate a sixth embodiment of the invention. The AND gate 28 shown in FIG. 2 is eliminated and the voltage range comparing means 30 is substituted by another voltage range comparing means 49 in the sixth embodiment. Based on the average voltage value from the voltage averaging circuit 29, the voltage range comparing means 49 determines whether or not the commercial power supply voltage is above a predetermined value, for example, 150 V, thereby generating a selection signal $S_6$. The error amplification means 50 composing the control means for controlling the "on" period of the switching transistor 8 is provided with first and second reference values $V_1$ and $V_2$ corresponding to different values of the commercial power supply voltage respectively. A display circuit 53 is provided and has two display means 51 and 52 each for displaying the high frequency power level.

In operation, when the power supply is put to the apparatus, the voltage range comparing means 49 determines whether or not the connected commercial power supply voltage is above 150 V, thereby generating the selection signal $S_6$. When it is determined that the commercial power supply voltage is below 150 V, the first reference value $V_1$ is selected by the selection signal $S_6$ such that the error amplification means 50 operates to control the "on" period of the switching transistor 8 so that the magnetron 15 maintains a low power, for example, 500 W, as shown in FIG. 21. On the other hand, when it is determined that the commercial power supply voltage is above 150 V, the second reference value $V_2$ is selected by the selection signal $S_6$, the "on" period of the switching transistor 8 is controlled so that the magnetron 15 maintains a high power, for example, 1,000 W. Simultaneously, one of the display means 39, 40 corresponding to the magnitude of the commercial power supply voltage is selected by the selection signal $S_6$ to thereby display the high frequency power level.

When the high frequency power is continuously maintained at 1,000 V regardless of the commercial power supply voltage switching, for example, between 100 and 200 V, the current flowing in the domestic wiring exceeds its allowable current value at the time of the low voltage. Such a disadvantage can be overcome by the arrangement of the sixth embodiment.

The foregoing disclosure and drawings are merely illustrative of the principles of the present invention and are not to be interpreted in a limiting sense. The only limitation is to be determined from the scope of the appended claims.

I claim:

1. A high frequency heating apparatus comprising:
   a) a frequency conversion section including a switching element and means for converting a commercial power supply frequency to high frequency waves by an on-off control of the switching element;
   b) a step-up transformer stepping up an alternating output from the frequency conversion section;
   c) a rectification circuit connected at a secondary side of the step-up transformer;
   d) a magnetron driven by a direct current output from the rectification circuit;
   e) an anode current detection circuit detecting an anode current of the magnetron;
   f) control means for controlling an "on" period of the switching element in response to a detection signal from the anode current detection circuit so that the anode current is maintained at a predetermined value, thereby stabilizing a high frequency power produced by the magnetron against different commercial power supplies;
   g) a magnetron temperature sensing section sensing a temperature of the magnetron; and
   h) means for compensating the "on" period of the switching element in accordance with the temperature of the magnetron sensed by the magnetron temperature sensing section so that an input power to the frequency conversion section is maintained at a predetermined value.

2. A high frequency heating apparatus according to claim 1, which further comprises a voltage detection section detecting a commercial power supply voltage supplied to the frequency conversion section and means for interrupting the operation of the switching element when the commercial power supply voltage detected by the detection section is out of a predetermined range.

3. A high frequency heating apparatus according to claim 1, which further comprises a voltage detection section detecting a voltage applied to the switching element and means for interrupting the operation of the magnetron when the voltage detected by the voltage detection section exceeds a predetermined allowable value.

4. A high frequency heating apparatus according to claim 3, which further comprises means for re-driving the magnetron a predetermined period after the interruption of the operation of the magnetron.

5. A high frequency heating apparatus according to claim 4, which further comprises means for controlling the magnetron so that when the number of interruptions of the magnetron operation reaches a preselected value, the magnetron is prevented from being driven thereafter.

6. A high frequency heating apparatus according to claim 1, which further comprises a magnetron temperature sensing section sensing the temperature of the magnetron and means for compensating the "on" period of the switching element in accordance with the temperature of the magnetron sensed by the magnetron temperature sensor so that an input power to the frequency conversion section is maintained at a predetermined value.

7. A high frequency heating apparatus according to claim 1, which further comprises means for interrupting the operation of the magnetron or reducing the high frequency power when the temperature of the magnetron sensed by the magnetron temperature sensing section exceeds a predetermined upper limit value.

8. A high frequency heating apparatus according to claim 1, which further comprises a switching element temperature sensing section sensing the temperature of the switching element and means for compensating the "on" period of the switching element in accordance with the temperature of the switching element sensed by the switching element temperature sensing section so that an input power to the frequency conversion section is maintained at a predetermined value.

9. A high frequency heating apparatus according to claim 8, which further comprises means for interrupting the operation of the magnetron or reducing the high frequency power when the temperature of the switching element sensed by the switching element temperature sensor exceeds a predetermined upper limit value.

10. A high frequency heating apparatus according to claim 1, which further comprises timing means for measuring an elapsed time from the completion of a previous cooking operation to the start of a present cooking operation and means for compensating the "on" period of the switching element in accordance with the elapsed time measured by the timing means so that an input power to the frequency conversion section is maintained at a predetermined value.

11. A high frequency heating apparatus according to claim 10, which further comprises a non-volatile memory sequentially storing data of the elapsed time from completion of the previous cooking operation.

12. A high frequency heating apparatus according to claim 1, which further comprises an output switching section switching a high frequency output from the magnetron, the output switching section being provided with a predetermined switching period in which the high frequency power is switched gradually or by degrees so as to reach an objective value.

13. A high frequency heating apparatus according to claim 1, wherein the step-up transformer has at a primary side thereof a winding number-of-turns selection section for selecting a turn ratio in accordance with a value of the commercial power supply voltage.

14. A high frequency heating apparatus comprising:
   a) a frequency conversion section including a switching element and converting a commercial power supply frequency to high frequency waves by an on-off control of the switching element;
   b) a step-up transformer stepping up an alternating output from the frequency conversion section;
   c) a rectification circuit connected at a secondary side of the step-up transformer;
   d) a magnetron driven by a direct current power from the rectification circuit;
   e) an anode current detection circuit detecting an anode current of the magnetron; and
   f) control means provided with first and second predetermined values selected in accordance with a value of a commercial power supply voltage, the control means controlling an "on" period of the switching element by comparing a detection signal from the anode current detection circuit with the selected one of the first and second predetermined values so that the magnetron anode current is maintained approximately at a predetermined value corresponding to the selected one of the first and second predetermined values.

15. A high frequency heating apparatus according to claim 14, which further comprises a display device displaying a high frequency power corresponding to the selected one of the first and second predetermined values with selection thereof.

16. A high frequency heating apparatus according to claim 15 wherein the step-up transformer is provided with secondary windings for securing power supplies for a fan motor for cooling the magnetron and other associated electrical equipments.

* * * * *